US006966866B2

(12) United States Patent
Ando et al.

(10) Patent No.: US 6,966,866 B2
(45) Date of Patent: Nov. 22, 2005

(54) POWER OUTPUTTING APPARATUS AND VEHICLE EQUIPPED WITH SAME

(75) Inventors: Daigo Ando, Suntō-gun (JP); Masaya Amano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/361,604

(22) Filed: Feb. 11, 2003

(65) Prior Publication Data

US 2003/0154945 A1 Aug. 21, 2003

(30) Foreign Application Priority Data

Feb. 20, 2002 (JP) ............................ 2002-043570

(51) Int. Cl.[7] ................................................ B60K 1/02

(52) U.S. Cl. ................. 477/4; 477/3; 475/5; 180/65.2; 180/65.3; 180/65.4

(58) Field of Search ...................... 477/3, 4; 180/65.3, 180/65.4, 65.2; 475/5; 318/630; 192/219.5; 290/40 C; 74/7 E

(56) References Cited

U.S. PATENT DOCUMENTS 5,558,595 A * 9/1996 Schmidt et al. ................ 477/3
5,775,449 A * 7/1998 Moroto et al. ............. 180/65.2
5,844,342 A * 12/1998 Miyatani et al. ............ 310/114
5,865,263 A * 2/1999 Yamaguchi et al. ....... 180/65.2
5,909,720 A * 6/1999 Yamaoka et al. ........ 123/179.3
5,934,395 A * 8/1999 Koide et al. ............... 180/65.2
5,991,683 A * 11/1999 Takaoka et al. ............ 701/102
6,356,817 B1 * 3/2002 Abe ........................... 701/22
6,512,967 B2 * 1/2003 Ostberg et al. ............... 701/22
6,555,927 B1 * 4/2003 Suzuki et al. ................. 290/34
6,558,289 B2 * 5/2003 Chung .......................... 477/3
6,656,082 B1 * 12/2003 Yamada et al. ................ 477/5
6,692,394 B2 * 2/2004 Takenaka ....................... 475/5
2003/0019674 A1 * 1/2003 Duan ....................... 180/65.3

FOREIGN PATENT DOCUMENTS

JP 6-17727 A 1/1994
JP 8-198067 A 8/1996
JP 8-216844 A 8/1996

* cited by examiner

*Primary Examiner*—Sherry Estremsky
*Assistant Examiner*—David D. Le
(74) *Attorney, Agent, or Firm*—Kenyon & Kenyon

(57) ABSTRACT

A power outputting apparatus determines whether a parking gear and a parking lock pole of a parking lock mechanism are engaged. When they are engaged, a second motor outputs a torque which is the sum of a pushing torque that is slightly greater than torque pulses generated in a ring gear shaft by the torque pulses of the engine during cranking, and a reaction force torque necessary for cranking so that a first motor cranks an engine. As a result, it is possible to suppress the parking gear and the parking lock pole of the parking lock mechanism from vibrating due to the torque pulses generated during cranking of the engine, and thus also minimize the contact noise resulting therefrom.

24 Claims, 4 Drawing Sheets

F I G . 1
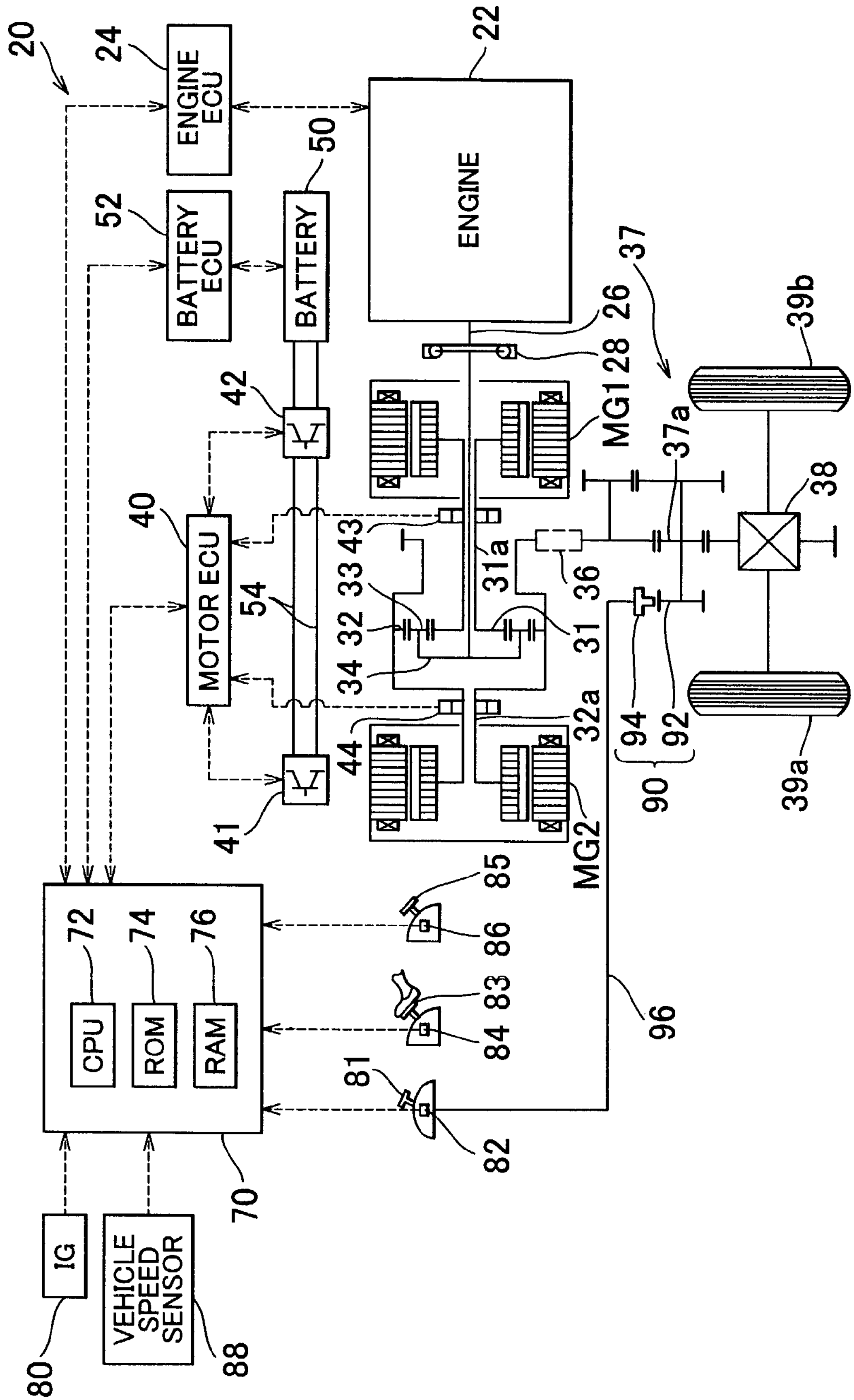

POWER OUTPUTTING APPARATUS AND VEHICLE EQUIPPED WITH SAME

INCORPORATION BY REFERENCE

The disclosure of Japanese Patent Application No. 2002-43570 filed on Feb. 20, 2002 including the specification, drawings and abstract is incorporated herein by reference in its entirety.

BACKGROUND OF THE INVENTION

1. Field of the Invention

The invention relates to a power outputting apparatus and a vehicle equipped with the power outputting apparatus.

2. Description of the Related Art

A typical power outputting apparatus is disclosed in Japanese Patent Laid-Open Publication No. 6-17727. This type of power outputting apparatus is mounted in a vehicle and is provided with a motor that directly drives a drive shaft coupled to driven wheels of the vehicle via a differential gear, and an internal combustion engine connected to the drive shaft via a planetary gear. This power outputting apparatus starts the internal combustion engine by cranking it with torque output from the motor while the motor is driving the drive shaft. Then, when the internal combustion engine is being started while the drive shaft is being driven by the motor with the internal combustion engine stopped, the clutch is engaged and the internal combustion engine is cranked by the torque output from the motor. At this time, a torque command value for the motor is set increased by a predetermined value so that the torque output to the drive shaft does not decrease due to the cranking.

With this power outputting apparatus, however, an abnormal noise may be generated when the internal combustion engine is started while the vehicle is stopped. When the gear is directly coupled to the output shaft of the internal combustion engine, contact noise from the gears may be generated by torque pulses and the like during startup of the internal combustion engine.

Moreover, with a power outputting apparatus which starts the internal combustion engine using a reaction force of the drive shaft, there may be contact noise from gears of a lock mechanism that locks the drive shaft either directly or indirectly by gear engagement when that lock mechanism is operated and the internal combustion engine is started.

SUMMARY OF THE INVENTION

Therefore, it is an object of the invention to provide a power outputting apparatus and a vehicle equipped with this apparatus, in which the generation of an abnormal noise that may be generated during startup of an internal combustion engine is suppressed.

In order to achieve the foregoing object, a power outputting apparatus according to a first aspect of the invention is capable of outputting power to a drive shaft, and includes an internal combustion engine, a lock portion that locks the drive shaft either directly or indirectly by gear engagement, a motor capable of outputting power to the drive shaft, a startup portion that starts the internal combustion engine using a reaction force on the drive shaft side, and a startup control portion. This startup control portion controls the motor so that one gear of the lock portion is pushed against to other gear of the lock portion by a torque greater than the torque of the reaction force generated in the drive shaft during startup of the internal combustion engine by the startup portion when an instruction to startup the internal combustion engine has been given. Along with this, the startup control portion also controls the startup portion so that the internal combustion engine is started with the motor being driven.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 1 is a block diagram schematically showing the configuration of a hybrid vehicle 20 equipped with a power outputting apparatus which is one exemplary embodiment of the invention;

DETAILED DESCRIPTION OF PREFERRED EMBODIMENTS

Figure 2:
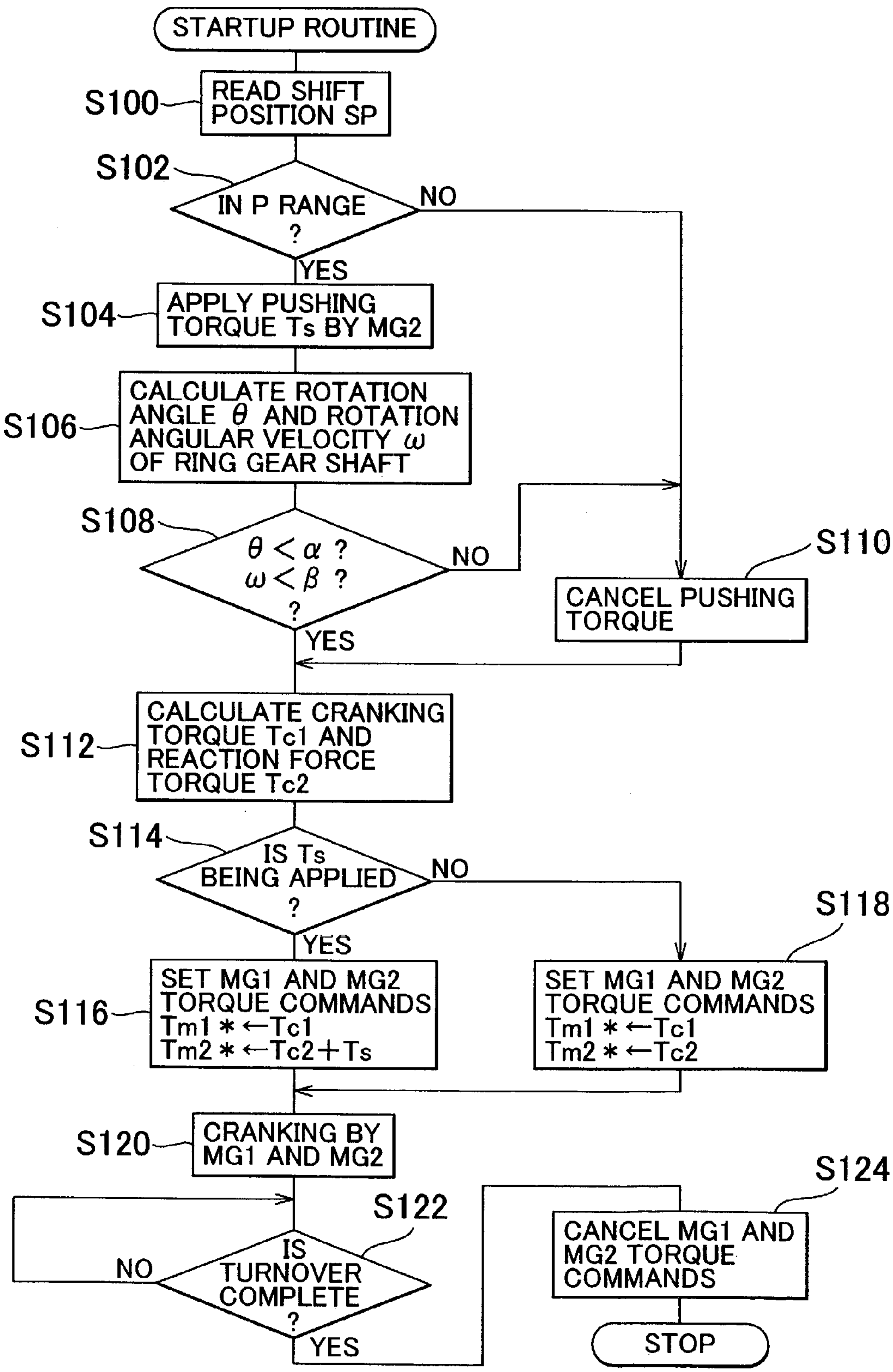
FIG. 2 is a flowchart illustrating one example of a startup routine executed by a hybrid electronic control unit.

Hereinafter, one exemplary embodiment of the invention shall be described with reference to the drawings. FIG. 1 is a block diagram schematically showing the configuration of a hybrid vehicle 20 which is equipped with a power outputting apparatus which is one exemplary embodiment of the invention. Referring to the figure, the hybrid vehicle 20 is provided with a engine 22, a three shaft type power splitting and combining mechanism that is connected via a damper 28 to a crankshaft 26 which serves as an output shaft of the engine 22, a motor MG1 that can generate power and which is connected to the power splitting and combining mechanism, a motor MG2 that can also generate power and which is also connected to the power splitting and combining mechanism, and a hybrid electronic control unit 70 that controls the entire power outputting apparatus.

The engine 22 is an internal combustion engine that outputs power by burning a hydrocarbon fuel, such as gasoline or diesel oil. The fuel injection, spark, and intake air volume adjustment and the like of the engine 22 are controlled by an engine electronic control unit (hereinafter, referred to as "engine ECU") 24, which receives signals from various sensors that detect the operating state of the engine 22. The engine ECU 24 communicates with the hybrid electronic control unit 70 and controls the operation of the engine 22 with control signals from the hybrid electronic control unit 70 and outputs data relating to the operating state of the engine 22 to the hybrid electronic control unit 70 as necessary.

The power splitting and combining mechanism includes a sun gear 31 with external teeth, a ring gear 32 with internal teeth disposed on the same axis as the sun gear 31, a plurality of pinion gears 33 that mesh with the sun gear 31 and the ring gear 32, and a carrier 34 that retains the plurality of pinion gears 33 such that they can rotate and revolve freely. The power splitting and combining mechanism includes a planetary gear set, with the sun gear 31, the ring gear 32, and the carrier 34 as rotating elements, which works as a differential.

The crankshaft 26, which serves as the output shaft of the engine 22, is coupled to the carrier 34, and the motor MG1 is coupled to the sun gear 31 via a sun gear shaft 31*a*. Further, the motor MG2 is coupled to the ring gear 32 via a ring gear shaft 32*a*.

When the motor MG1 functions as a generator, the power splitting and combining mechanism divides power from the engine 22 that is input to the carrier 34 according to the respective gear ratios on the sun gear 31 side and the ring gear 32 side. When the motor MG1 functions as a motor, the power splitting and combining mechanism combines the power from the engine 22 that is input by the carrier 34 with the power from the motor MG1 that is input by the sun gear 31, and outputs that combined power to the ring gear 32.

The ring gear 32 is mechanically connected to driven wheels 39*a* and 39*b*, which are front wheels of the vehicle, via a belt 36, a gear mechanism 37, and a differential gear 38. Accordingly, the power output to the ring gear 32 is output to the driven wheels 39*a* and 39*b* via the belt 36, the gear mechanism 37, and the differential gear 38.

The three shafts connected to the power splitting and combining mechanism are the crankshaft 26, the sun gear shaft 31*a*, which is a rotating shaft of the motor MG1, and the ring gear shaft 32*a*, which is a drive shaft mechanically connected to the driven wheels 39*a* and 39*b*.

The gear mechanism 37 is provided with a parking lock mechanism 90 that stops the drive shaft from rotating when a shift lever 81 is positioned in a P range. The parking lock mechanism 90 includes a parking gear 92 that is coupled to a final gear 37*a* and a parking lock pole 94 that meshes with the parking gear 92 and locks it when it is not rotating.

The parking lock pole 94 is coupled via a shift cable 96 to the shift lever 81. When the shift lever 81 is moved to the P range, that movement of the shift lever 81 is transmitted via the shift cable 96 so as to move the parking lock pole 94 up and down. Accordingly, the parking lock pole 94 engages the parking lock by meshing with the parking gear 92 and disengages the parking lock by disengaging from the parking gear 92.

The final gear 37*a* is mechanically connected to the ring gear shaft 32*a* serving as the drive shaft. As a result, the parking lock mechanism 90 indirectly locks the ring gear shaft 32*a*.

The motors MG1 and MG2 are both well-known synchronous generator motors that can be driven as generators and as motors. The motors MG1 and MG2 are both supplied with, as well as supply, power to and from the battery 50 via inverters 41 and 42.

The inverters 41 and 42 and the battery 50 are connected together with power lines 54. The power lines 54 include a cathode bus and an anode bus that are shared between the inverters 41 and 42. The power generated by one of the motors MG1 and MG2 can be consumed by the other motor MG1 or MG2. Accordingly, the battery 50 can be charged by the power generated by the motors MG1 and MG2 and discharged when the power generated by the motors MG1 and MG2 is insufficient. If the power balance of the motors MG1 and MG2 is even, the battery 50 will not charge or discharge.

The motors MG1 and MG2 are both controlled by a motor electronic control unit (hereinafter, referred to as "motor ECU") 40. Signals necessary to control the motors MG1 and MG2 are input to the motor ECU 40. For example, signals from rotational position detecting sensors 43 and 44 that detect a rotational position of rotors in the motors MG1 and MG2, and phase currents applied to the motors MG1 and MG2 detected by current sensors (not shown) are input to the motor ECU 40. The motor ECU 40 then outputs switching control signals to the inverters 41 and 42.

The motor ECU 40 communicates with the hybrid electronic control unit 70 and controls the motors MG1 and MG2 with control signals from the hybrid electronic control unit 70. Further, the motor ECU 40 outputs signals (i.e., data) regarding the operating state of the motors MG1 and MG2 to the hybrid electronic control unit 70 when necessary.

The battery 50 is controlled by a battery electronic control unit (hereinafter, referred to as "battery ECU") 52 which receives signals necessary for controlling the battery 50. For example, the battery ECU 52 receives signals indicating a voltage between terminals from a voltage sensor (not shown) disposed between the terminals of the battery 50, signals indicating a charge/discharge current from a current sensor (not shown) mounted on the power line 54 that is connected to an output terminal of the battery 50, and signals indicating battery temperature from a temperature sensor (not shown) mounted on the battery 50. The battery ECU 52 outputs signals (i.e., data) regarding the state of the battery 50 to the hybrid electronic control unit 70 when necessary. The battery ECU 52 also calculates the state-of-charge (SOS) of the battery 50 based on an integrated value of the charge/discharge current detected by the current sensor in order to control the battery 50.

The hybrid electronic control unit 70 includes a microprocessor that has a CPU 72 as the main component. In addition to the CPU 72, the hybrid electronic control unit 70 also includes ROM 74 that stores a routine program, RAM 76 that temporarily stores data, and an input/output port and a communication port (both not shown). The hybrid electronic control unit 70 receives via the input port various signals such as an ignition signal from an ignition switch 80, a signal indicative of a shift position SP from a shift position sensor 82 that detects an operating position of the shift lever 81, a signal indicative of accelerator opening AP from an accelerator pedal position sensor 84 that detects a depression amount of an accelerator pedal 83, a signal indicative of a brake pedal position BP from a brake pedal position sensor 86 that detects a depression amount of a brake pedal 85, and a signal indicative of a vehicle speed V from a vehicle speed sensor 88. As described above, the hybrid electronic control unit 70 is connected via the communication port to the engine ECU 24, the motor ECU 40, and the battery ECU 52, and sends and receives various control signals and data to and from each of these.

Next, operation of the hybrid vehicle 20 according to the foregoing exemplary embodiment, and more specifically, operation during startup of the engine 22, will be described. FIG. 2 is a flowchart illustrating one example of a startup routine executed by the hybrid electronic control unit 70. This routine is executed when there has been an instruction to start up the engine 22.

When the startup routine is executed, the CPU 72 of the hybrid electronic control unit 70 first reads the shift position SP from the shift position sensor 82 (step S100). The CPU 72 then determines whether the shift position SP is in the P range (step S102).

When the shift position SP is in the P range, the motor MG2 is driven so as to exert a pushing torque Ts (step S104). More specifically, the value of the pushing torque Ts set by the CPU 72 of the hybrid electronic control unit 70 is sent to the motor ECU 40 as a torque command Tm2* for the motor MG2. The motor ECU 40 then switches the inverters 41 and 42 based on the received torque command Tm2* and controls the motor MG2 so that the output therefrom matches the torque command Tm2*.

Here, the pushing torque Ts is set as a torque that is slightly greater than a torque acting on the ring gear shaft 32*a* due to torque pulses generated by the engine 22 when the engine 22 is started up. The pushing torque Ts is also set as a torque that is in the same direction as the torque output from the motor MG2 so that the ring gear shaft 32*a* does not rotate by the motor MG1 when the engine 22 is started up.

The amount of the pushing torque Ts can be determined by the characteristics and the like of the engine 22.

The torque generated by the motor MG2 based on the pushing torque Ts set in this way acts on the ring gear shaft 32*a*. At this time, a rotation angle θ and a rotation angular speed ω after a predetermined time has passed after the pushing torque Ts is generated, are calculated based on the rotational position of the ring gear shaft 32*a* detected by the rotational position detecting sensor 44 that is mounted thereon (step S106). The hybrid electronic control unit 70 then determines whether the calculated rotation angle θ is less than a threshold α and whether the calculated rotational angular velocity ω is less than a threshold β (step S108).

Figure 3:
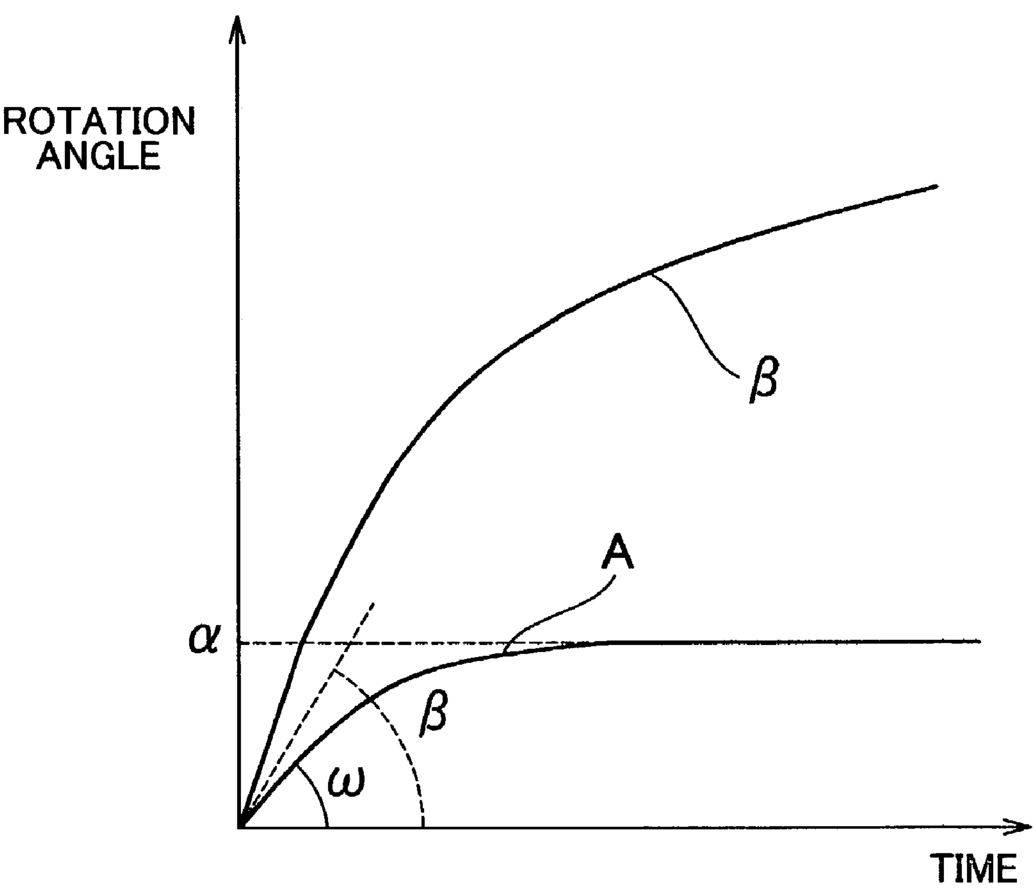
FIG. 3 is a graph illustrating examples of rotating states of a ring gear shaft when a pushing torque is applied thereto.

FIG. 3 is a graph illustrating examples of rotating states of the ring gear shaft 32*a* when the pushing torque Ts is applied thereto. In the figure, a curved line A shows the rotating state of the ring gear shaft 32*a* when the parking lock mechanism 90 is engaged. Also in the figure, a curved line B shows the rotating state of the ring gear shaft 32*a* when the parking lock mechanism 90 is disengaged. The parking lock mechanism 90 is such that, when the shift lever 81 is placed in the P range, the parking lock pole 94 engages with the parking gear 92, i.e., the parking lock mechanism 90 becomes engaged. At this time, when the pushing torque Ts is output from the motor MG2 to the ring gear shaft 32*a*, rotation of the ring gear shaft 32*a* is suppressed because the parking lock pole 94 and the parking gear 92 are engaged. Therefore, the rotation angle θ and the rotation angular velocity ω of the ring gear shaft 32*a* are both low values.

Even when the shift lever 81 is in the P range, there are times when the parking lock pole 94 is not engaged with the parking gear 92, i.e., there are times when the parking lock mechanism 90 is disengaged. At this time, when the pushing torque Ts is output from the motor MG2 to the ring gear shaft 32*a*, rotation of the ring gear shaft 32*a* is not suppressed because the parking lock pole 94 and the parking gear 92 are not engaged. Accordingly, the rotation angle θ and the rotation angular velocity ω of the ring gear shaft 32*a* are both large values.

Based on this rotation, it is then determined in step S108, whether the parking lock mechanism 90 is engaged by the rotation angle θ and the rotation angular velocity ω. Here, when a predetermined amount of time has passed after the pushing torque Ts from the motor MG2 acts on the ring gear shaft 32*a*, the threshold α is set to a value that is greater than the rotation angle of the ring gear shaft 32*a* detected when the parking lock mechanism 90 is engaged and smaller than the rotation angle of the ring gear shaft 32*a* detected when the parking lock mechanism 90 is disengaged. Further, when a predetermined amount of time has passed after the pushing torque Ts from the motor MG2 acts on the ring gear shaft 32*a*, the threshold β is set to a value that is greater than the rotation angular velocity of the ring gear shaft 32*a* that is calculated when the parking lock mechanism 90 is engaged and smaller than the rotation angular velocity of the ring gear shaft 32*a* that is calculated when the parking lock mechanism 90 is disengaged. Both the threshold α and the threshold β are determined by experiment or the like.

When it has been determined in step S108 that the rotation angle θ is equal to, or greater than, the threshold a and the rotation angular velocity ω is equal to, or greater than, the threshold β, or when it has been determined in step S102 that the shift position SP is not in the P range, the parking lock mechanism 90 is not engaged. At this time, the pushing torque Ts that would generated by the motor MG2 and act on the ring gear shaft 32*a* is cancelled in order to prevent the ring gear shaft 32*a* that serves as the drive shaft from rotating to or beyond a predetermined rotation angle when the engine 22 starts up (step S110).

Next, regardless of whether the shift position SP is in the P range or whether the parking lock mechanism 90 is engaged, a cranking torque Tc1 necessary for the motor MG1 to crank the engine 22 and a reaction force torque Tc2 necessary for the ring gear shaft 32*a* in order to have the cranking torque Tc1 from the motor MG1 act on the engine 22 are calculated in step S112.

When the motor MG1 cranks the engine 22, the cranking torque Tc1 output from the motor MG1 is input to the sun gear 31 of the power splitting and combining mechanism and then output to the carrier 34. Accordingly, the cranking torque Tc1 is calculated as torque for cranking the engine 22 and torque to be output to the sun gear shaft 31*a* based on the gear ratio of the sun gear and the carrier when the ring gear 32 is fixed.

Also, the reaction force torque Tc2 is the torque necessary for fixing the ring gear 32 when the motor MG1 outputs the cranking torque Tc1. That is, the reaction force torque Tc2 is the torque necessary for fixing the ring gear shaft 32*a* when the cranking torque Tc1 acts on the sun gear shaft 31*a* of the power splitting and combining mechanism when the carrier 34 is fixed. Accordingly, the reaction force torque Tc2 is calculated based on the cranking torque Tc1 and the gear ratio of the sun gear and the ring gear when the carrier is fixed.

Next, it is determined whether the pushing torque Ts is being applied (step S114). When the pushing torque Ts is being applied, the cranking torque Tc1 is set as a torque command Tm1* for the motor MG1 and the sum of the reaction force torque Tc2 and the pushing torque Ts is set as a torque command Tm2* for the motor MG2 (step S116). On the other hand, when the pushing torque Ts is not being applied, the cranking torque Tc1 is set as the torque command Tm1* for the motor MG1 and the reaction force torque Tc2 is set as the torque command Tm2* for the motor MG2 (step S118).

Then, the motors MG1 and MG2 are driven by the set torque commands Tm1* and Tm2*, respectively, to crank the engine 22 (step S120).

When the pushing torque Ts is being applied, the motor MG2 outputs a torque which is the sum of the reaction force torque Tc2 that receives a reaction force from the cranking by the motor MG1 and the pushing torque Ts that is in the same direction as the reaction force torque Tc2. Therefore, contact noise generated by the parking gear 92 and the parking lock pole 94 vibrating from the torque pulses when the engine 22 is cranking is able to be minimized.

On the other hand, when the pushing torque Ts is not being applied, the motor MG2 outputs the reaction force torque Tc2 receiving only the reaction force of the cranking by the MG1, so the ring gear shaft 32*a* rotates, thus enabling rotation of the driven wheels 39*a* and 39*b* to be prevented.

In step S122, cranking continues the until the engine 22 turns over under its own power, at which time the process proceeds on to step S124. In step S124, the torque commands to the motors MG1 and MG2 are cancelled and the startup routine ends.

According to the hybrid vehicle 20 of the exemplary embodiment described above, when the shift position SP is in the P range, it is determined whether the parking lock mechanism 90 is engaged. When the parking lock mechanism 90 is engaged, the motor MG2 outputs a torque which is the sum of the pushing torque Ts that is slightly greater than the torque pulses generated in the ring gear shaft 32*a* by the torque pulses of the engine 22 during cranking and the reaction force torque Tc2 necessary for cranking from the MG2. Therefore, contact noise generated by the parking gear 92 and the parking lock pole 94 of the parking lock mechanism 90 vibrating from the torque pulses when the engine 22 is cranking is able to be minimized. That is, the motor MG2 is controlled with a torque greater than the torque of the reaction force generated in the drive shaft so that the meshed gears of the parking lock mechanism 90 are pushed to one side. Therefore, the engine 22 is started with this motor MG2 being driven so abnormal noise from the engaging portions when the gears of the parking lock mechanism 90 vibrate due to the torque pulses and the like from the engine 22 that accompany startup can be suppressed. Furthermore, regardless of whether the shift position SP is in the P range, when the parking lock mechanism 90 is disengaged, only the reaction force torque Tc2 that just receives the reaction force of the cranking from the motor MG2 is output. As a result, excessive torque output from the motor MG2 is able to be minimized, thereby enabling rotation of the driveshaft, or rotation of the driven wheels 39*a* and 39*b* from excessive torque to be prevented.

In the hybrid vehicle 20 of this exemplary embodiment, the amount of the pushing torque Ts is slightly greater than the torque acting on the ring gear shaft 32*a* from the torque pulses of the engine 22 during startup of the engine 22. However, as long as the pushing torque Ts is greater than the torque acting on the ring gear shaft 32*a* from the torque pulses, the actual amount of that pushing torque Ts does not particularly matter. Further, according to the hybrid vehicle 20 of this exemplary embodiment, the direction of the pushing torque Ts is the same as that of the reaction force torque Tc2 acting on the ring gear shaft 32*a* while cranking the engine 22. Alternatively, however, that direction may be reversed. In this case, the amount of the pushing torque Ts may be the sum of the reaction force torque Tc2 and a value slightly greater than the torque acting on the ring gear shaft 32*a* from the torque pulses.

In the hybrid vehicle 20 of this exemplary embodiment, engagement of the parking lock mechanism 90 is determined by the rotation angle θ and the rotation angular velocity ω of the ring gear shaft 32*a* when the pushing torque Ts is applied thereto. Alternatively, however, engagement of the parking lock mechanism 90 may also be determined based on just the rotation angle θ of the ring gear shaft 32*a* when the pushing torque Ts is applied, or just the rotation angular velocity ω of the ring gear shaft 32*a* when the pushing torque Ts is applied thereto. Further, the determination of whether the parking lock mechanism 90 is engaged is not limited to being based on the rotation angle θ and the rotation angular velocity ω of the ring gear shaft 32*a*. Alternatively, the determination of whether the parking lock mechanism 90 is engaged may be based on the rotation angle and the rotation angular velocity of the final gear 37*a*, or on the amount of movement of the driven wheels 39*a* and 39*b* and the speed with which they move.

Figure 4:
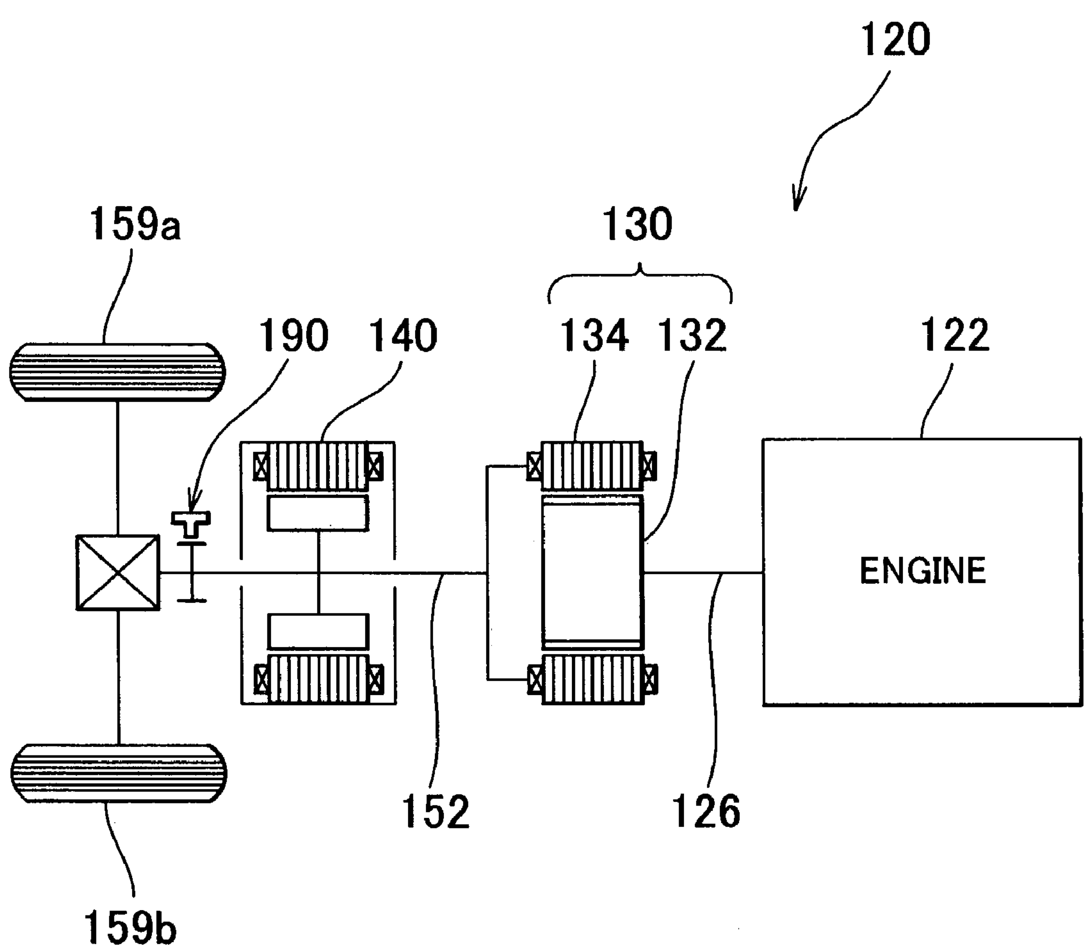
FIG. 4 is a block diagram schematically showing a configuration of a hybrid vehicle according to a modified example.

The hybrid vehicle 20 of this exemplary embodiment is configured such that the engine 22 is cranked using the reaction force of the ring gear shaft 32*a* serving as the drive shaft by the motors MG1 and MG2 that are connected to each other via the power splitting and combining mechanism. However, as long as the engine 22 is cranked using the reaction force of the drive shaft, the hybrid vehicle 20 may be configured other ways as well. For example, as shown in FIG. 4, a hybrid vehicle 120 according to a modified example may also is provided with a motor 130 that has an inner rotor 132 connected to a crankshaft 126 of an engine 122 and an outer rotor 134 mounted on a drive shaft 152 that is coupled to driven wheels 159*a* and 159*b*, and in which the outer rotor 134 rotates relative to the inner rotor 132 by electromagnetic action of the inner rotor 132 and the outer rotor 134, a motor 140 capable of outputting power directly to the driveshaft 152, and a parking lock mechanism 190 that directly locks the drive shaft 152. In the hybrid vehicle 120 according to this modified example, the engine 122 is cranked by the motor 130 while receiving a reaction force from the motor 140 that is connected to the drive shaft 152. Therefore, by determining whether the parking lock mechanism is engaged and having the motor 140 apply the pushing torque, it is possible to achieve the same effect as the hybrid vehicle 20 of the exemplary embodiment of the invention.

Although the invention has been described herein with reference to specific embodiments, many modifications and variations therein will readily occur to those skilled in the art. Accordingly, all such variations and modifications are included within the intended scope of the invention.

What is claimed is:

1. A power outputting apparatus capable of outputting power to a drive shaft, comprising:

an internal combustion engine;

a lock portion that locks the drive shaft either directly or indirectly by gear engagement;

a startup portion that starts the internal combustion engine using a reaction force on the drive shaft; and a startup control portion which, when an instruction for startup of the internal combustion engine has been given, controls a motor to apply a torque to the lock portion greater than a torque of the reaction force generated in the drive shaft during startup of the internal combustion engine by the startup portion, and which controls the startup portion so that the internal combustion engine is started by being driven by another motor.

2. The power outputting apparatus according to claim 1, wherein:

the startup control portion controls the motor so as to output a torque in a direction in which the torque of the reaction force is applied.

3. The power outputting apparatus according to claim 1, wherein:

the locking portion includes a first locking gear acting upon a second locking gear coupled to the drive shaft, the torque generated by the motor pushes the first locking gear of the lock portion against the second locking gear of the lock portion.

4. The power outputting apparatus according to claim 1, wherein:

the lock portion includes a first locking gear acting upon a second locking gear coupled to the drive shaft, and the startup control portion controls the motor so that a torque equal to, or greater than a torque required to ensure the first locking gear of the lock portion remains pushed against the second locking gear of the lock portion when the lock portion receives a torque pulse generated during startup of the internal combustion engine by the startup portion.

5. The power outputting apparatus according to claim 1, further comprising:

a three shaft power splitting and combining portion that has three shafts connected to an output shaft of the internal combustion engine, the drive shaft, and a rotating shaft of the startup portion, the three shaft power splitting and combining portion inputting and outputting power determined based on power input to and output from any two of the three shafts to the remaining shaft.

6. The power outputting apparatus according to claim 1, wherein:

the startup portion is provided with a double rotor motor having a first rotor connected to an output shaft of the internal combustion engine and a second rotor connected to the drive shaft and able to rotate relative to the first rotor, the first rotor being electromagnetically controllable with respect to the second rotor.

7. The power outputting apparatus according to claim 1, wherein:

the lock portion is a parking lock of a vehicle.

8. The power outputting apparatus according to claim 1, further comprising:

a lock state determining portion that determines a lock state of the drive shaft by the lock portion, wherein, when the lock state determining portion determines that the drive shaft is not locked, the startup control portion controls the motor so as to output a torque that cancels a reaction force generated in the drive shaft during startup of the internal combustion engine by the startup portion, and controls the startup portion so that the internal combustion engine is started.

9. The power outputting apparatus according to claim 8, wherein:

the lock state determining portion determines the lock state of the drive shaft based on a movement of the drive shaft when a predetermined torque is applied thereto.

10. The power outputting apparatus according to claim 9, wherein:

the lock state determining portion determines the lock state of the drive shaft based on at least one of a rotation angle and a rotation angular velocity of the drive shaft.

11. A control method for a power outputting apparatus which is provided with an internal combustion engine, a drive shaft and a lock portion, and which is capable of outputting power from the internal combustion engine to the drive shaft, the control method comprising the steps of:

determining a lock state of the drive shaft;

controlling a motor if the lock state of the locking portion is locked to apply a torque greater than a torque of a reaction force generated in the drive shaft when an instruction to start the internal combustion engine has been given; and starting the internal combustion engine being driven by another motor.

12. The control method according to claim 11, wherein:

the motor is controlled so as to output a torque in a direction in which the torque of the reaction force is applied.

13. The control method according to claim 11, wherein:

the locking portion includes a first locking gear acting upon a second locking gear coupled to the drive shaft, the torque generated by the motor pushes the first locking gear of the lock portion against the second locking gear of the lock portion.

14. The control method according to claim 11, wherein:

the torque generated by the motor is output equal to or greater than a torque required to ensure that a first locking gear in the lock portion remains pushed against a second locking gear in the lock portion coupled to the drive shaft when the lock portion receives a torque pulse generated during startup of the internal combustion engine.

15. The control method according to claim 11, wherein:

the torque generated by the motor is a torque that cancels a reaction force generated in the drive shaft during startup of the internal combustion engine when the drive shaft is not locked.

16. The control method according to claim 11, wherein:

the lock state determination of the drive shaft is made based on a movement of the drive shaft when a predetermined torque is applied thereto.

17. The control method according to claim 11, wherein:

the lock state determination of the drive shaft is made based on at least one of a rotation angle and a rotation angular velocity of the drive shaft.

18. A power outputting apparatus capable of outputting power to a drive shaft, comprising:

an internal combustion engine;

locking means for locking the drive shaft either directly or indirectly by gear engagement;

starting means for starting the internal combustion engine using a reaction force on the drive shaft; and startup controlling means for controlling, when an instruction for startup of the internal combustion engine has been given, controls a motor to apply a torque to the locking means greater than a torque of the reaction force generated in the drive shaft during startup of the internal combustion engine by the starting means, and controlling the starting means so that the internal combustion engine is started by being driven by another motor.

19. The power outputting apparatus according to claim 18, wherein:

the startup controlling means controls the motor so as to output a torque in a direction in which a torque of the reaction force is applied.

20. The power outputting apparatus according to claim 18, wherein:

the locking means includes a first locking gear acting upon a second locking gear coupled to the drive shaft, the torque generated by the motor pushes the first locking gear of the locking means against the second locking gear of the locking means.

21. The power outputting apparatus according to claim 18, wherein:

the locking means includes a first locking gear acting upon a second locking gear coupled to the drive shaft, and the startup controlling means controls the motor so that a torque equal to, or greater than a torque required to ensure the first locking gear of the locking means remains pushed against the second locking gear of the locking means when the locking means receives a torque pulse generated during startup of the internal combustion engine by the starting means.

22. The power outputting apparatus according to claim 18, further comprising:

lock state determining means for determining a lock state of the drive shaft by the locking means, wherein, when the lock state determining means determines that the drive shaft is not locked, the startup controlling means controls the motor so as to output a torque that applies a reaction force generated in the drive shaft during startup of the internal combustion engine by the starting means, and controls the starting means so that the internal combustion engine is started.

23. The power outputting apparatus according to claim 22, wherein:

the lock state determining means determines the lock state of the drive shaft based on a movement of the drive shaft when a predetermined torque is applied thereto.

24. The power outputting apparatus according to claim 23, wherein:

the lock state determining means determines the lock state of the drive shaft based on at least one of a rotation angle and a rotation angular velocity of the drive shaft.

* * * * *